United States Patent
Agiwal et al.

(10) Patent No.: US 8,837,522 B2
(45) Date of Patent: Sep. 16, 2014

(54) SYSTEM AND METHOD OF ENCODING AND DECODING CONTROL INFORMATION IN A MEDIUM ACCESS CONTROL PROTOCOL DATA UNIT

(75) Inventors: Anil Agiwal, Bangalore (IN); Young-Bin Chang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 333 days.

(21) Appl. No.: 13/098,829

(22) Filed: May 2, 2011

(65) Prior Publication Data

US 2011/0268031 A1    Nov. 3, 2011

(30) Foreign Application Priority Data

Apr. 30, 2010    (IN) .......................... 1227/CHE/2010

(51) Int. Cl.
*H04J 3/16*    (2006.01)

(52) U.S. Cl.
USPC ........... 370/470; 370/310; 370/392; 370/419; 370/474

(58) Field of Classification Search
USPC .......................... 370/389, 392, 419, 474, 310
See application file for complete search history.

(56) References Cited

U.S. PATENT DOCUMENTS

| | | | | |
|---|---|---|---|---|
| 6,788,707 B1 * | 9/2004 | Horton et al. | ................. | 370/474 |
| 7,327,726 B2 * | 2/2008 | Kye | ............................... | 370/389 |
| 7,386,013 B1 * | 6/2008 | Beser | ............................ | 370/477 |
| 7,835,360 B2 * | 11/2010 | Lansing et al. | ................ | 370/392 |
| 7,907,611 B2 * | 3/2011 | Stacey | ............................ | 370/389 |
| 8,166,375 B2 | 4/2012 | Saito et al. | | |
| 8,280,399 B2 * | 10/2012 | Kang et al. | .................. | 455/456.1 |
| 8,291,130 B2 * | 10/2012 | Raju et al. | ........................ | 710/33 |
| 2002/0067721 A1 | 6/2002 | Kye | | |
| 2007/0211719 A1 * | 9/2007 | Johnson et al. | ................ | 370/389 |
| 2009/0190612 A1 * | 7/2009 | Bae et al. | ........................ | 370/477 |
| 2009/0245166 A1 * | 10/2009 | Okuda | ............................ | 370/315 |
| 2009/0296683 A1 | 12/2009 | Raju et al. | | |
| 2009/0300328 A1 | 12/2009 | Raju et al. | | |
| 2012/0014366 A1 | 1/2012 | Kim et al. | | |
| 2012/0236853 A1 * | 9/2012 | Kim et al. | ...................... | 370/389 |
| 2013/0250973 A1 | 9/2013 | Agiwal et al. | | |

FOREIGN PATENT DOCUMENTS

| | | |
|---|---|---|
| JP | 2009-272759 | 11/2009 |
| JP | 2012-524450 | 10/2012 |
| JP | 2012-533259 | 12/2012 |
| JP | 2013-511885 | 4/2013 |

* cited by examiner

*Primary Examiner* — Ricky Ngo
*Assistant Examiner* — Dewanda Samuel
(74) *Attorney, Agent, or Firm* — The Farrell Law Firm, P.C.

(57) ABSTRACT

Methods and apparatuses are provided for transmitting and receiving a MAC PDU. The MAC PDU including a MAC header, an extended header group and a payload is generated. The MAC PDU is transmitted to a receiving device. The extended header group includes a first field that indicates whether at least one extended header is included in the extended header group, and a second field that indicates a length of the extended header group.

24 Claims, 14 Drawing Sheets

SYSTEM AND METHOD OF ENCODING AND DECODING CONTROL INFORMATION IN A MEDIUM ACCESS CONTROL PROTOCOL DATA UNIT

PRIORITY

This application claims priority under 35 U.S.C. §119(a) to India Provisional Application No. 1227/CHE/2010, filed on Apr. 30, 2010, which is incorporated herein by reference for all purposes.

BACKGROUND OF THE INVENTION

1. Field of the Invention

The present invention relates generally to the field of wireless communication protocols, and more particularly, to encoding and decoding control information in a Medium Access Control (MAC) Protocol Data Unit (PDU).

2. Description of the Related Art

Broadband wireless networks are based on various communication standards. For example, the Institute of Electrical and Electronics Engineers (IEEE) 802.16e based Worldwide Interoperability for Microwave Access (WiMAX) standard, and its evolution to IEEE 802.16m, provides various types of services such as voice, packet data exchange, and the like.

A connection is established between a mobile station and a base station to exchange service or control information associated with various types of services. The type of connection established between the mobile station and the base station depends on the type of the information to be exchanged. Typically, a control connection is established if control information needs to be exchanged, whereas a transport connection is established when service information exchange. Typically, the service data or control data is exchanged between the mobile station and the base station using MAC PDUs.

The MAC PDU format includes a MAC Header, an Extended Header (EH) group, and payload data. Typically, two types of MAC headers exist, a Generic MAC Header (GMH) and a Short Packet MAC Header (SPMH). Either the GMH or the SPMH is used in the MAC PDU and is negotiated between the base station and the mobile station at the time of connection establishment. The GMH format (based on the IEEE 802.16m standard) includes a flow IDentifier (ID) field, an EH field, and a length field. The SPMH consists of a flow ID field, an EH field, a length field, and a sequence number field.

A connection is identified by the flow ID field. The EH field indicates whether an EH group is present in the MAC PDU. Further, the length field gives information about the length of the MAC PDU. The sequence number field in the SPMH indicates numbering of the transmitted MAC PDUs. The EH group contains an EH group length field and one or more EHs. The EH group length field indicates a length of the EH group in the first byte of the EH group field. Also, each of the one or more EHs includes a type field and a body contents field. The type field indicates a type of EH and the body contents field indicates the type-dependent contents.

Typically, a Length Extended Header (LEH) is encoded in the EH group field when the length of the MAC PDU is greater than 2047 bytes. The presence and absence of a large length field is indicated by the presence/absence of the LEH in the EH group field. When the MAC PDU including the LEH in the EH group field is received by a receiver, the receiver has to parse the EH group field to decode the LEH and determine the 14 bit length field. It is understood that, the 11 bits in the length field in the GMH and the 3 bits of the length field in the LEH together form the 14-bit length field that defines the length of the MAC PDU. Since, this 14-bit length field is not contiguous, processing of the length field in the received MAC PDU may become more complex and hence affect the performance of the receiver.

Additionally, the EH group field may carry variable size EHs. Sometimes, for high data rate connections involving multiplexing information, or when a large number of transport control protocol acknowledgements need to be transmitted, the length information associated with the EHs may exceed the size that can be encoded in the EH length field (e.g., 8 bits). Consequently, efficiency and performance of a wireless communication system may be significantly affected.

SUMMARY OF THE INVENTION

The present invention has been made to address at least the above problems and/or disadvantages and to provide at lest the advantages described below. Accordingly, an aspect of the present invention provides a method and system for encoding and decoding control information in a medium access control (MAC) protocol data unit (PDU).

According to one aspect of the present invention, a method is provided for transmitting a MAC PDU in a transmitting device. The MAC PDU including a MAC header, an extended header group and a payload is generated. The MAC PDU is transmitted to a receiving device. The extended header group includes a first field that indicates whether at least one extended header is included in the extended header group, and a second field that indicates a length of the extended header group.

According to another aspect of the present invention, an apparatus is provided for transmitting a MAC PDU. The apparatus includes a processor for generating the MAC PDU comprising a MAC header, an extended header group and a payload. The apparatus also includes a transceiver for transmitting the MAC PDU to a receiving device. The extended header group includes a first field that indicates whether at least one extended header is included in the extended header group, and a second field that indicates a length of the extended header group.

According to an additional aspect of the present invention, a method is provided for receiving a MAC PDU in a receiving device. The MAC PDU is received, and a MAC header, an extended header group and a payload that are included in the MAC PDU are decoded. The extended header group includes a first field that indicates whether at least one extended header is included in the extended header group, and a second field that indicates a length of the extended header group.

According to a further aspect of the present invention, an apparatus is provided for receiving a MAC PDU. The apparatus includes a transceiver for receiving the MAC PDU, and a processor for decoding a MAC header, an extended header group and a payload that are included in the MAC PDU. The extended header group includes a first field that indicates whether at least one extended header is included in the extended header group, and a second field that indicates a length of the extended header group.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
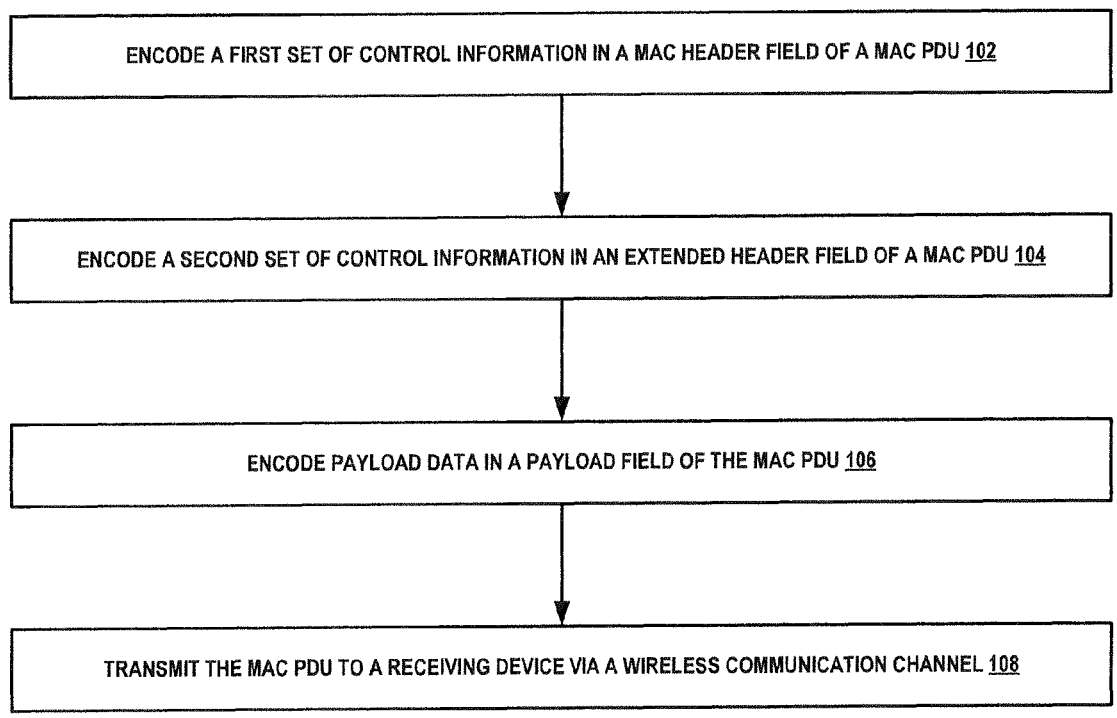
FIG. 1 is a flowchart illustrating a method of encoding control information in a MAC PDU, according to an embodiment of the present invention.

Embodiments of the present invent are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention.

FIG. 1 is a flowchart illustrating a method of encoding control information in a MAC PDU, according to an embodiment of the present invention. A transmitting device generates the MAC PDU. In step 102, a first set of control information is encoded in a MAC header field of a MAC PDU. In step 104, a second set of control information is encoded in an EH group field following the MAC header field. In an embodiment of the present invention, the first set of control information in conjunction with the second set of control information indicate a short length or a long length of the MAC PDU, whether EHs are present in the EH group field, and optionally indicate whether the EH group field is of a short length or a long length. In step 106, payload data is encoded in a payload field of the MAC PDU. In step 108, the MAC PDU is transmitted to a receiving device via a wireless communication channel.

Figure 2:
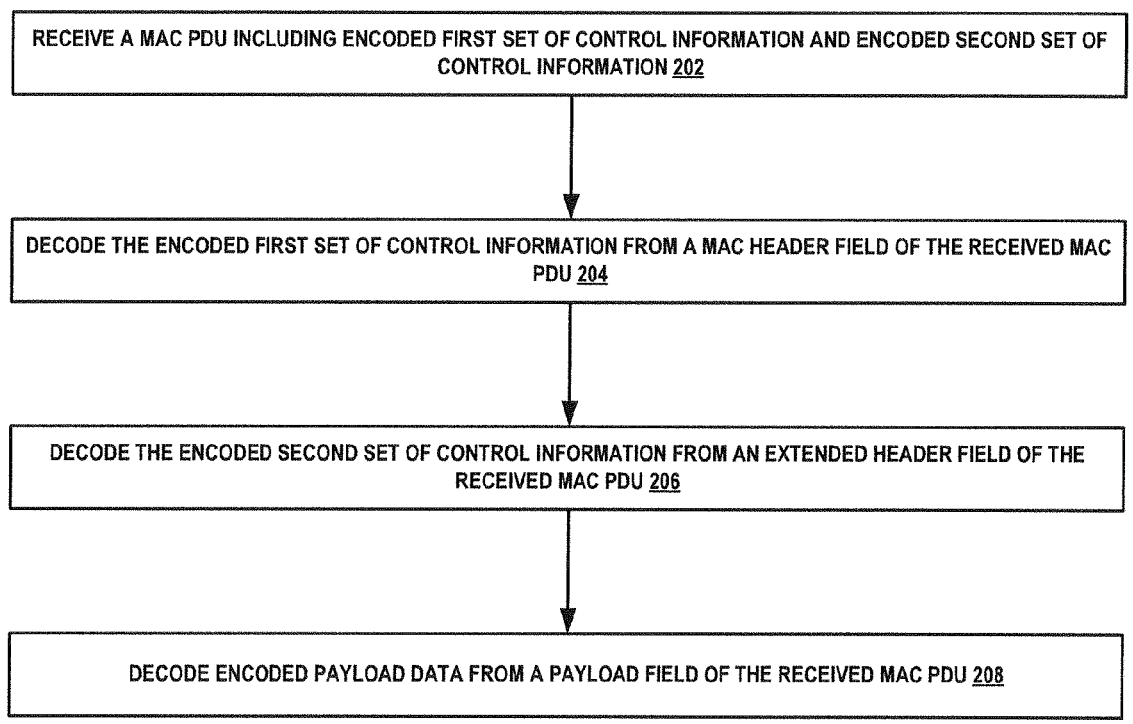
FIG. 2 is a flowchart illustrating a method of decoding the encoded control information in the MAC PDU, according to an embodiment of the present invention.

FIG. 2 is a flowchart illustrating a method of decoding the encoded control information in the MAC PDU, according to an embodiment of the present invention. In step 202, a MAC PDU including an encoded first set of control information in the MAC header field of the MAC PDU and an encoded second set of control information in the EH group field of the MAC PDU is received from a transmitting device via a wireless communication channel. In step 204, the encoded first set of control information is decoded from the MAC header field of the MAC PDU.

In step 206, the encoded second set of control information is decoded from the EH group field following the MAC header field. In an embodiment of the present invention, the decoded first set of decoded control information in conjunction with the decoded second set of control information indicate the length of MAC PDU, whether EHs are present in the EH group field, and whether the EH group field is a short length or a long length. The indication of the length of the EH group field is optional. In step 208, encoded payload data is decoded from the payload field of the MAC PDU based on the decoded first set of control information and the decoded second set of control information.

Figure 3:
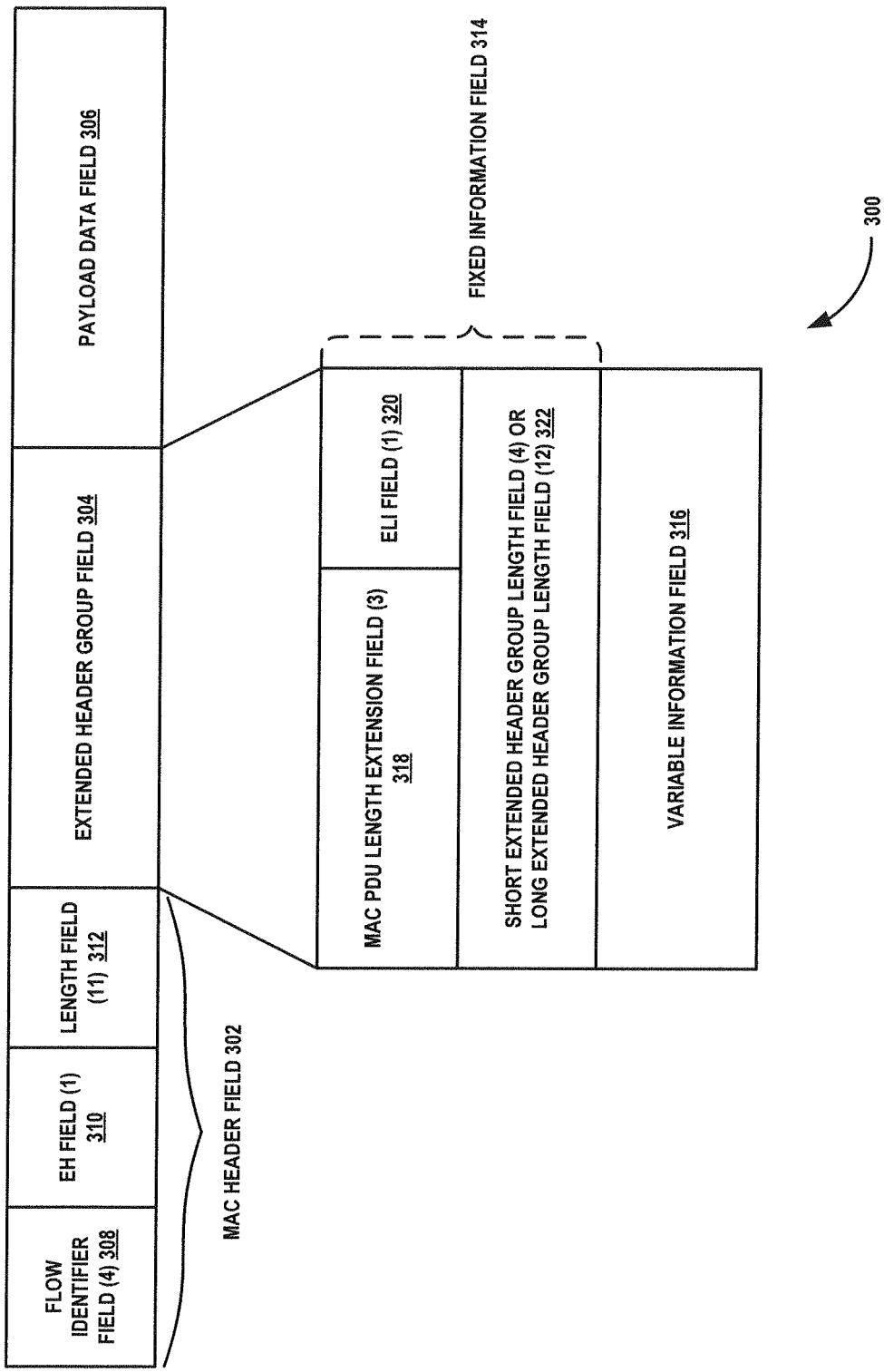
FIG. 3 is a diagram illustrating a MAC PDU format for carrying control information, according to an embodiment of the present invention.

Referring now to FIG. 3, a diagram illustrates a MAC PDU format 300 for carrying control information, according to an embodiment of the present invention. The MAC PDU 300 includes a MAC header field 302, an EH group field 304 following the MAC header field 302, and a payload field 306 following the EH group field 304. The MAC header 302 is a generic MAC header and includes a flow ID 308, an EH length field 310, and a length field 312. The EH group field 304 includes a fixed information field 314, and a variable information field 316. The fixed information field 314 includes a MAC PDU length extension field 318, an EH Length Indicator (ELI) field 320, and short/long EH group length field 322. The variable information field 316 includes zero or more EHs 324.

In an embodiment of the present invention, the EH field 310 indicates presence or absence of the EH group field 304 in the MAC PDU 100. The length field 312 in conjunction with the MAC PDU length extension field 318 indicate a length of the MAC PDU 100. The ELI field 320 indicates whether the EH group field is a short length or a long length. The short/long EH group length field 322 indicates the length of the EHs or a length of the EH group field 304. In an embodiment of the present invention, the short/long EH group length field 322 in conjunction with the EH field 310 indicates the presence or absence of the EHs.

Figure 4:
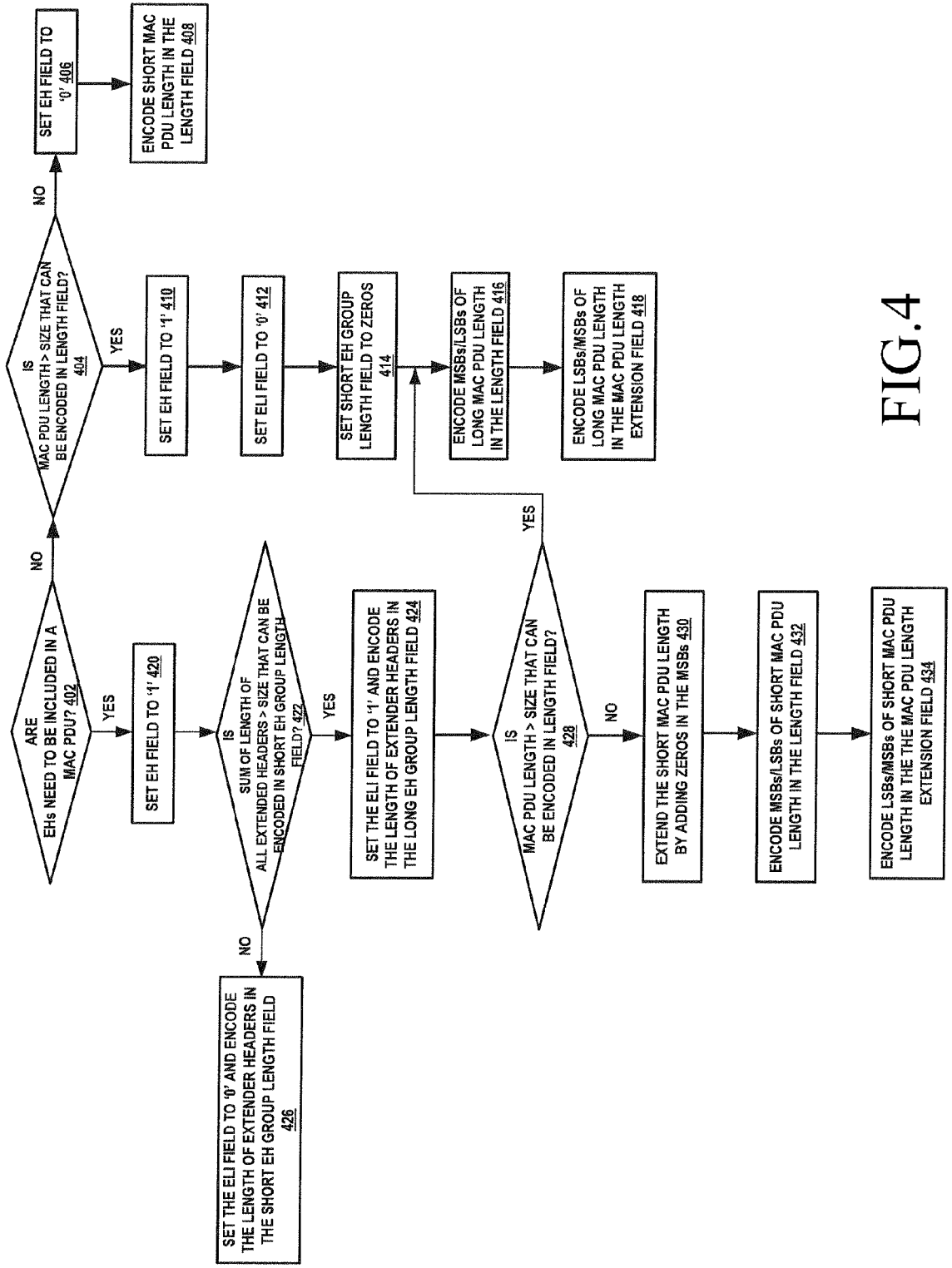
FIG. 4 is a flowchart illustrating a method of encoding control information in the MAC PDU, according to an embodiment of the present invention.

FIG. 4 is a flowchart illustrating a method of encoding control information in the MAC PDU 300, according to according to an embodiment of the present invention. In step 402, it is determined whether any EHs need to be included in the MAC PDU 300. If no EHs are to be included, it is determined whether the length of the MAC PDU 300 is greater than a size that can be encoded in the length field 312, in step 404. For example, the size of the length field 312 is 11 bits and the MAC PDU length from zero to 2047 bytes can be encoded in length field 312. If it is determined that the length is not greater than the size than can be encoded, information associated with the absence of the EH group field 304 and absence of the long MAC PDU length is encoded in the EH field 310, in step 406. For example, the EH field 310 is set to '0' to indicate the absence of the EH group field 304. In step 408, a short length of the MAC PDU is encoded in the length field 312.

If, in step 404, it is determined that the length is greater than the size that can be encoded, information associated with the presence of the EH group field 304 is encoded in the EH field 310, in step 410. For example, the EH field 310 is set to '1' to indicate the presence of the EH group field 304. In step 412, length information associated with the EH group field 304 is encoded in the ELI field 320. For example, the ELI field 320 is set to '0' to indicate that the EH group field 304 is a short length. In step 414, the short EH group length field 322 is set to zero to indicate the absence of EHs in the variable information field 316. Alternatively, when the short EH group length field 322 is used to indicate the length of the EH group field 304, then the short EH group length field 322 is set to the size of the fixed information field 314. For example, when the size of MAC PDU length extension field 318 is 3 bits, the size of the ELI field 320 is 1 bit and the size of the short EH group length field 322 is 4 bits, then the short EH group length field 322 is set to '1'. At step 416, Most Significant Bits (MSBs)/Least Significant Bits (LSBs) of the long length MAC PDU 300 are encoded in the length field 312. In step 418, LSBs/MSBs of the long length MAC PDU 300 are encoded in the MAC PDU length extension field 318. One skilled in the art will understand that the long length of the MAC PDU 300 is encoded in the length field 312 and the MAC PDU length extension field 318. Hence, a need to parse EHs in the EH group field 304 by the receiving device to determine the length of the MAC PDU 300 is eliminated.

If it is determined that EHs are to be included in step 402, information associated with the presence of the EH group field 304 is encoded in the EH field 310 in step 420. For example, the EH field 310 is set to '1' to indicate the presence of the EH group field 304. In step 422, when the EH group length field 322 indicates the length of the EHs, it is determined whether a sum of the length of all EHs to be encoded in the EH group length field is greater than the size that can be encoded in the short EH group length field 322. If the sum of the length to be encoded in the EH group length field is greater than the length that can be encoded in the short EH group length field 322, long length indication associated with the EH group field 304 is encoded in the ELI field 320 in step 424.

Alternatively, when the EH group length field 322 indicates the length of the EH group field 304 in step 422, it is determined whether the length of the EH group field 304 to be encoded in the EH group length field is greater than the size that can be encoded in the short EH group length field 322. If the determined length of the EH group field 304 to be encoded in the EH group length field is greater than the size that can be encoded in the short EH group length field 322, long length indication associated with the EH group field 304 is encoded in the ELI field 320 in step 424. For example, the ELI field 320 is set to '1' to indicate that the EH group field 304 is a long length. Also, at step 424, length information of the EHs in the EH group field 304 is encoded in the long EH group length field 322. It can be noted that, if the long EH group length field 322 indicates length of the EH group field 304, then length equal to a sum of length of EHs+2 is encoded in the long EH group length field 322.

When the EH group length field 322 indicates the length of the EHs and the sum of the length of extended headers to be encoded in the EH group length field is smaller than or equal to the size that can be encoded in the short EH group length field 322 in step 422, a short length indication associated with the EH group field 304 is encoded in the ELI field 320 in step 426. Alternatively, when the EH group length field 322 indicates the length of the EH Group field 304 and the length of EH group field 304 to be encoded in the EH group length field is smaller than or equal to the size that can be encoded in the short EH group length field 322 in step 422, short length indication associated with the EH group field 304 is encoded in the ELI field 320 in step 426. For example, the ELI field 320 is set to '0' to indicate that the EH group field 304 is short length. Also, in step 426, length information associated with the EHs in the EH group field 304 is encoded in the short EH group length field 322. It is noted that, if the short EH group length field 322 indicates a length of the EH group field 304, then a length equal to a sum of length of EHs+1 is encoded in the long EH group length field 322.

In step 428, it is determined whether the length of the MAC PDU 300 is greater than the size that can be encoded in the length field 312. If it is determined that the length is greater than the size that can be encoded, the process is routed to step 416, and steps 416 and 418 are performed. Otherwise, in step 430, the short MAC PDU length is extended by adding zeros in the MSBs. In step 432, MSBs/LSBs of the short length MAC PDU 300 are encoded in the length field 312. In step 434, LSBs/MSBs of the short length MAC PDU 300 are encoded in the MAC PDU length extension field 318. Alternatively, the short MAC PDU length may not be extended by adding zeros in step 428. In such case, the short MAC PDU length without extension is encoded in the length field 312 and zeros are encoded in the MAC PDU length extension field 318.

The MAC header field 302 in the MAC PDU 300 is a SPMH type, in an embodiment of the present invention, and the EH field 310 is set to '1' if EHs are present in the EH group field 304. A MAC PDU length may be encoded in a MAC PDU according to known techniques. The MAC PDU length extension field 318 in the EH group field 304 is set to zeros and the ELI field 320 in the EH group field 304 is also set to zeros. The length of the EH group field 304 is set in the short EH group length field 322.

In another embodiment of the present invention, an EH field is set to '1' if EHs are present in an EH group field. The length of the MAC PDU length is encoded in the MAC PDU according to the prior art. An EH group field with fixed information consisting of only an 8-bit EH group length is used to encode the EH group length when EH is set to '1' in the MAC PDU. The MAC PDU length extension field 318, and the ELI field 320 are not present in the EH group field for the MAC PDU with the SPMH.

Figure 5:
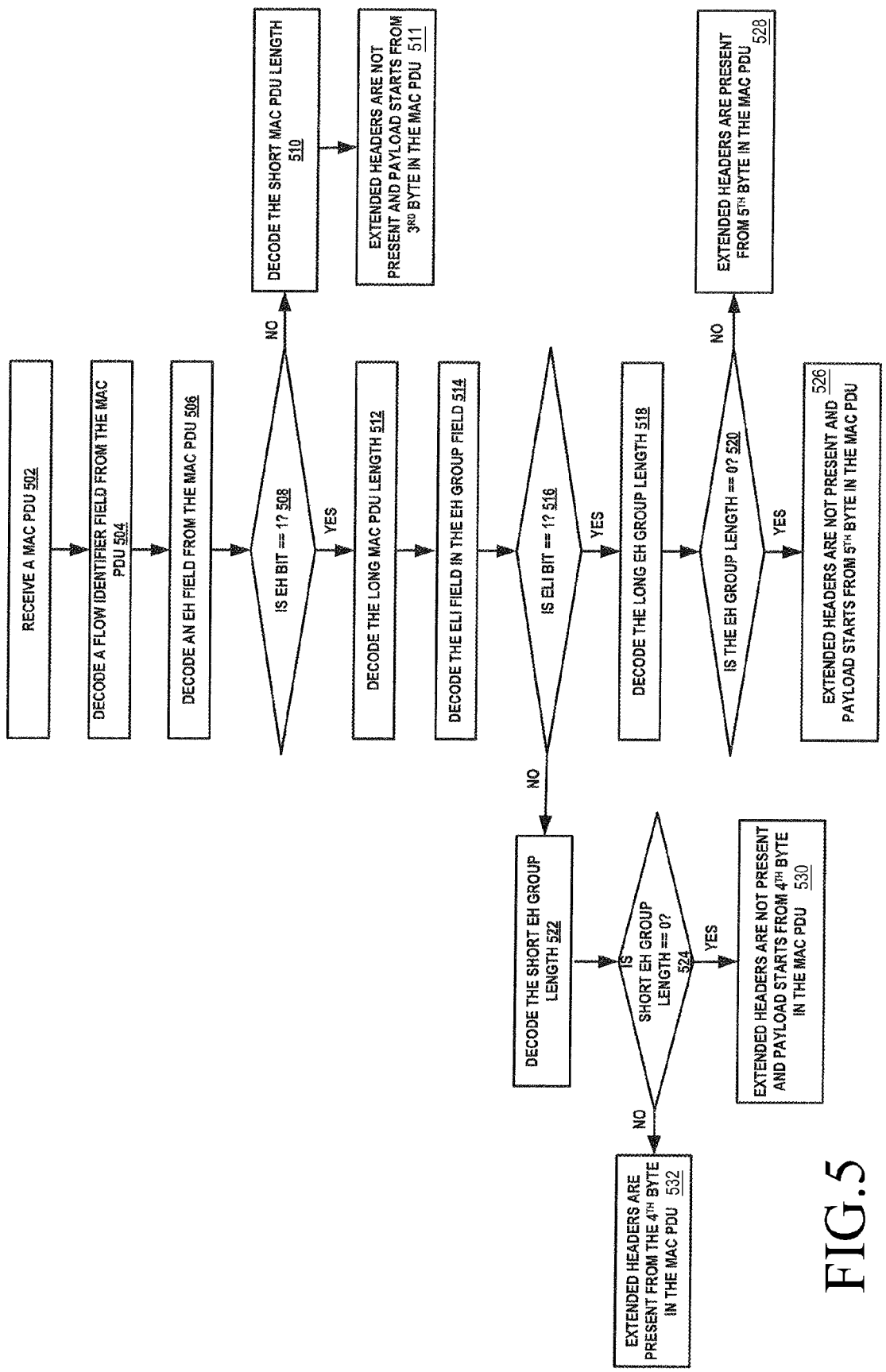
FIG. 5 is a flowchart illustrating a method of decoding control information in the MAC PDU, according to an embodiment of the present invention.

FIG. 5 illustrates a flowchart of a method of decoding control information in the MAC PDU 300, according to an embodiment of the present invention. In step 502, the MAC PDU 300 is received at a receiving device. Upon receiving the MAC PDU 300, the receiving device decodes control information from first n bytes in the received MAC PDU 300, as described in greater below, where n equals a size of the MAC header field 302 and a size of the fixed information field 314. In step 504, connection type information is decoded from the flow ID field 308. In step 506, information associated with the presence or the absence of the EH group field 304 in the MAC PDU 300 is decoded from the EH field 310. In step 508, it is determined whether the EH group field 304 is present in the MAC PDU 300. Specifically, it is determined whether the EH field 310 is set to '1'. If the EH field 310 is set to '0', a short MAC PDU length is decoded from the length field 312 in step 510. When the EH field is set to '0', it implies that EH group field 304 is absent and the payload field 306 starts from the nth byte of the MAC PDU 300, in step 511, where n equals to size of the MAC header field 302 plus one.

If the EH field 310 is set to '1', MAC PDU length information is decoded from the length field 312 and the MAC PDU length extension field 318 in step 512. In an embodiment of the present invention, the decoded MAC PDU length information indicates the long length of the MAC PDU 300. One skilled in the art will realize that encoding of the MAC PDU length information in the length field 312 and the MAC PDU length extension field 318 enables the receiving device to decode the 14 bit length field without parsing the extended headers in the EH group field 304. In step 514, EH group field length information is decoded from the ELI field. For example, the EH group field length information indicates a long length EH group field (when ELI is set to '1') or a short length EH group field (when ELI is set to '0').

In step 516, it is determined whether the EH group field length information indicates a long length EH group field. If it is determined that it indicates a long length group field, information associated with the presence of EHs is decoded from the long EH group length field 322, in step 518. In step 520, it is determined whether the length information in the long EH group length field 322 is set to zero. If it is set to zero, it implies that EHs are not present in the variable information field 316 and the payload field 306 starts from the nth byte of the MAC PDU 300, in step 526, where n equals to size of the MAC header field 302 plus size of the fixed information field 314 plus one. For example, n equals 5 when a size of the MAC header field is 2 bytes and a size of the fixed information field 314 is 2 bytes including 3 bit MAC PDU length extension field 318, 1 bit ELI field 320 and 12 bit long EH group length field 322.

If it is determined that the length information in the long EH group length field 322 is not set to zero in step 520, it implies that EHs are present in the variable information field 316 and starts from the nth byte of the MAC PDU 300, in step 528, where n equals to size of the MAC header field 302 plus size of the fixed information field 314 plus one. When the EH group length field 322 indicates the length of the EH group field 304 and not only the length of EHs in the EH group field 304, it is determined whether the length information in the long EH group length field 322 is set to the size of the fixed information field 314 in step 520. For example, when the size of the MAC PDU length extension field 318 is 3 bits, the size of the ELI field 320 is 1 bit and the long EH group length field 322 is 12 bits, then the size of the fixed information field 314 is 2 bytes.

If it is determined that the length information in the long EH group length field 322 is set to the size of the fixed information field, it implies that EHs are not present in the variable information field 316 and the payload field 306 starts from the nth byte of the MAC PDU 300, where n equals a size of the MAC header field 302 plus a size of the fixed information field 314 plus one. If it is determined that the length information in the long EH group length field 322 is not set to the size of the fixed information field, it implies that EHs are present in the variable information field 316 and starts from the nth byte of the MAC PDU 300, where n equals a size of the MAC header field 302 plus a size of the fixed information field 314 plus one.

If, in step 516, it is determined that the EH group field length information does not indicate a long length EH group field, information associated with the presence of EHs is decoded from the short EH group length field 322, in step 522. In step 524, it is determined whether the length information in the short EH group length field 322 is set to zero. If it is determined that it is set to zero, it implies that EHs are not present in the variable information field 316 and the payload field 306 starts from the nth byte of the MAC PDU 300, in step 530, where n equals a size of the MAC header field 302 plus a size of the fixed information field 314 plus one. For example, n equals 4 when the size of the MAC header field 302 is 2 bytes and the size of the fixed information field 314 is 1 byte, including a 3 bit MAC PDU length extension field 318, 1 bit ELI field 320 and 4 bit short EH Group length field 322.

If it is determined that the length information in the short EH group length field 322 is not set to zero, it implies that EHs are present in the variable information field 316 and starts from the nth byte of the MAC PDU 300, in step 532, where n equals a size of the MAC header field 302 plus a size of the fixed information field 314 plus one. When the EH group length field 322 indicates the length of the EH group field 304 and not only the length of EHs in the EH group field 304, it is determined whether the length information in the short EH group length field 322 is set to the size of the fixed information field 314 in step 524. For example, when the size of MAC PDU length extension field 318 is 3 bits, the size of the ELI field 320 is 1 bit and the short EH group length field 322 is 4 bits, then the size of the fixed information field is 1 byte.

If it is determined that the length information in the short EH group length field 322 is set to the size of the fixed information field 314, it implies that EHs are not present in the variable information field 316 and the payload field 306 starts from the nth byte of the MAC PDU 300, where n equals a size of the MAC header field 302 plus a size of the fixed information field 314 plus 1. For example, n equals 4 when the size of the MAC header field 302 is 2 bytes and the size of the fixed information field 314 is 1 byte including a 3 bit MAC PDU length extension field 318, 1 bit ELI field 320 and 4 bit short EH group length field 322. If it is determined that the length information in the short EH group length field 322 is not set to the size of the fixed information field 314, it implies that EHs are present in the variable information field 316 and starts from the nth byte of the MAC PDU 300, where n equals a size of the MAC header field 302 plus a size of the fixed information field 314 plus one.

Figure 6:
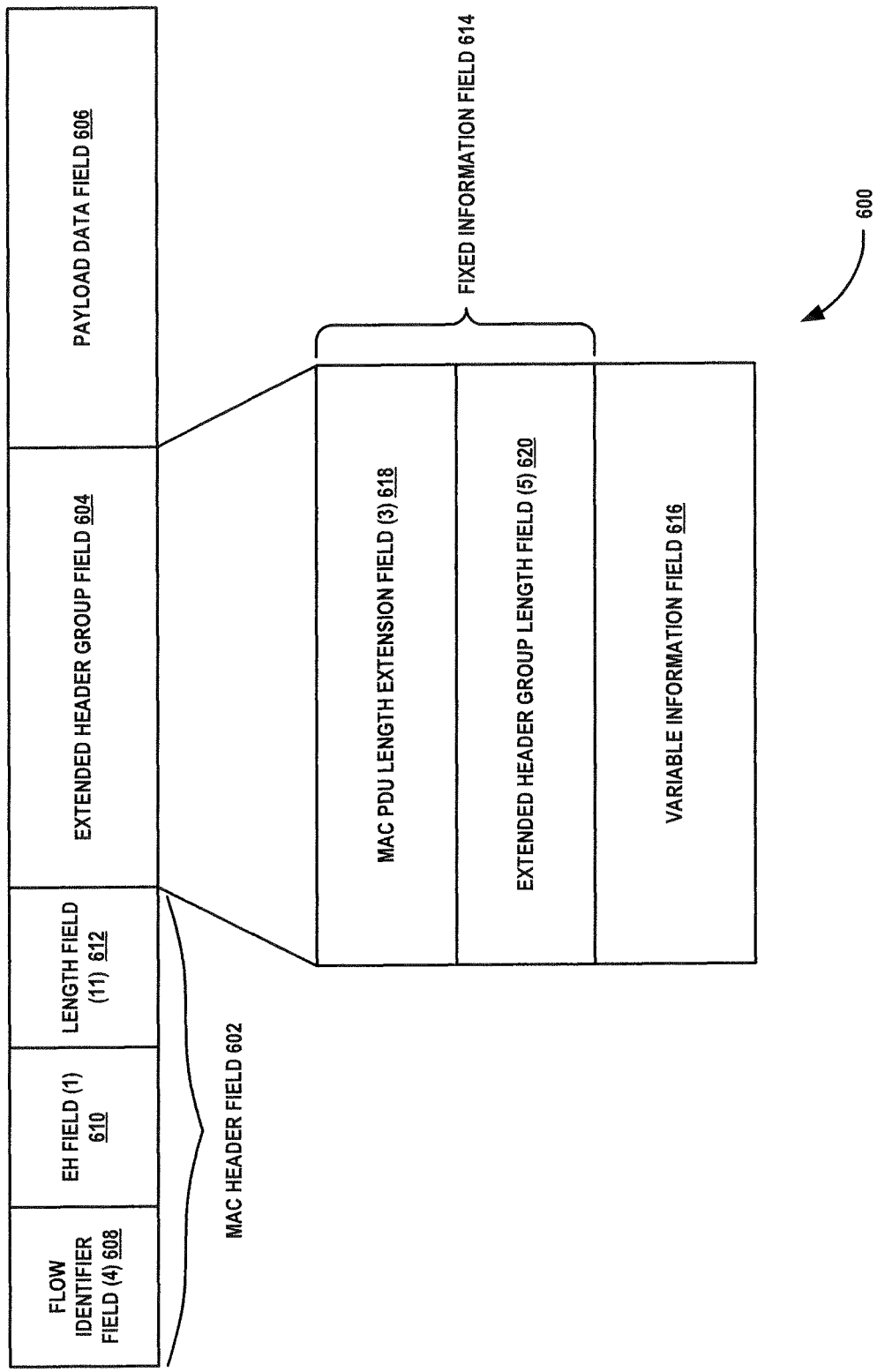
FIG. 6 is a diagram illustrating a MAC PDU format for carrying control information, according to an embodiment of the present invention.

Referring now to FIG. 6, a diagram illustrates a MAC PDU format 600 for carrying control information, according to an embodiment of the present invention. The MAC PDU 600 includes a MAC header field 602, an EH group field 604 following the MAC header field 602, and a payload data field 606 following the EH group field 604. The MAC header 602 is a generic MAC header and includes a flow ID 608, an EH length field 610, and a length field 612. The EH group field 604 includes a fixed information field 614, and a variable information field 616. The fixed information field 614 includes a MAC PDU length extension field 618, and an EH group length field 620. The variable information field 616 includes zero or more EHs 624. It can be seen that the MAC PDU 600 does not include an ELI field and a short/long EH group length field and includes only the EH group length field 620 in the fixed information field 614.

In an embodiment of the present invention, the EH field 610 indicates the presence or absence of the EH group field 604 in the MAC PDU 600. The length field 612 in combination with the MAC PDU length extension field 618 indicates the length of the MAC PDU 600. The EH group field length field 620 indicates the length of the EHs or the length of the EH group field 604. In an embodiment of the present invention, the EH group length field 620 in conjunction with the EH field 610 indicates the presence or absence of the extended headers.

Figure 7:
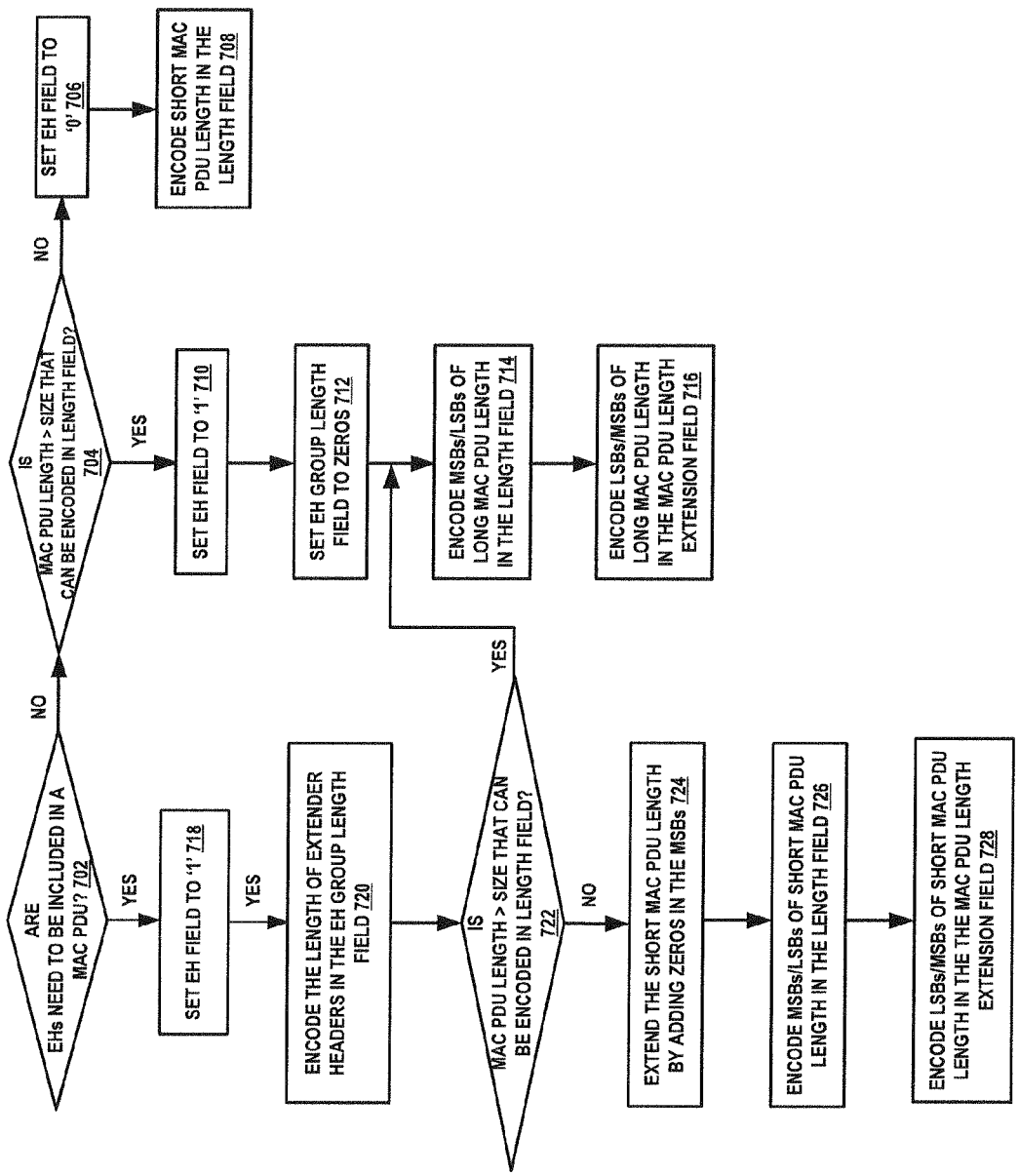
FIG. 7 is a flowchart illustrating a method of encoding control information in the MAC PDU, according to an embodiment of the present invention.

FIG. 7 is a flowchart illustrating a method of encoding control information in the MAC PDU 600, according to another embodiment of the present invention. In step 702, it is determined whether any EHs need to be included in the MAC PDU 600. If no EHs are to be included, it is determined whether the length of the MAC PDU 600 is greater than the size that can be encoded in the length field 612 in step 704. If it is determined that it is not greater than the size that can be encoded, information associated with the absence of the EH group field is encoded in the EH field 610 in step 706. For example, the EH field 610 is set to '0' to indicate the absence of the EH group field 604. At step 708, a short length of the MAC PDU is encoded in the length field 612.

If, in step 704, it is determined that the length of the MAC PDU 500 is greater than the size that can be encoded, information associated with the presence of the EH group field 604 is encoded in the EH field 610, in step 710. For example, the EH field 610 is set to '1' to indicate the presence of the EH group field 604. In step 712, the EH group length field 620 is set to zero to indicate the absence of EHs in the variable information field 616. Alternatively, when the EH group length field 620 is used to indicate the length of the EH group field 604, then the EH group length field 620 is set to the size of the fixed information field 614. For example, when the size of the MAC PDU length extension field 618 is 3 bits and the EH Group length field 620 is 5 bits, then the EH group length field 620 is set to '1'. In step 714, MSBs or LSBs of the long length MAC PDU 600 are encoded in the length field 612. In step 716, the LSBs or the MSBs of the long length MAC PDU 600 are encoded in the MAC PDU length extension field 618. One skilled in the art will realize that the long length of the MAC PDU 600 is encoded in the length field 612 and the MAC PDU length extension field 618. Thus, the need to parse EHs in the EH group field 604 by the receiving device to determine the length of the MAC PDU 600 is eliminated.

If is determined that EHs need to be included in step 702, information associated with the presence of the EH group field 604 is encoded in the EH field 610 in step 718. For example, the EH field 610 is set to '1' to indicate the presence of the EH group field 604. In step 720, a length of the EHs in the EH group field 604 is encoded in the EH group length field 620. It is noted that, if the EH group length field 620 indicates a length of the EH group field 604, then a length equal to a sum of a length of EHs plus a size of the fixed information field 614 is encoded in the EH group length field 622.

In step 722, it is determined whether the length of the MAC PDU 600 is greater than the size that can be encoded in the length field 612. If it is determined that it is greater than the size that can be encoded, the process is routed to step 714. Otherwise, a short length of the MAC PDU 600 is extended by adding zeros in the MSBs in step 724. In step 726, MSBs/LSBs of the short length MAC PDU 600 are encoded in the length field 612. In step 728, LSBs/MSBs of the short length MAC PDU 600 are encoded in the MAC PDU length extension field 618.

The MAC header field 602 in the MAC PDU 600 is a SPMH type, in an embodiment of the present invention, and the EH field 610 is set to '1' if EHs are present in the EH group field 604. A MAC PDU length is encoded in a MAC PDU according to known techniques. The MAC PDU length extension field 618 in the EH group field 304 is set to zeros. The length of the EH group field 604 is set in the EH group length field 620.

In another embodiment of the present invention, an EH field is set to '1' if EHs are present in an EH group field. The length of the MAC PDU length is encoded in the MAC PDU according to known techniques. An EH group field with fixed information consisting of only an 8-bit EH group length is used to encode the EH group length when EH is set to '1' in the MAC PDU. The MAC PDU length extension field 618 is not present in the EH group field for the MAC PDU with the SPMH.

Figure 8:
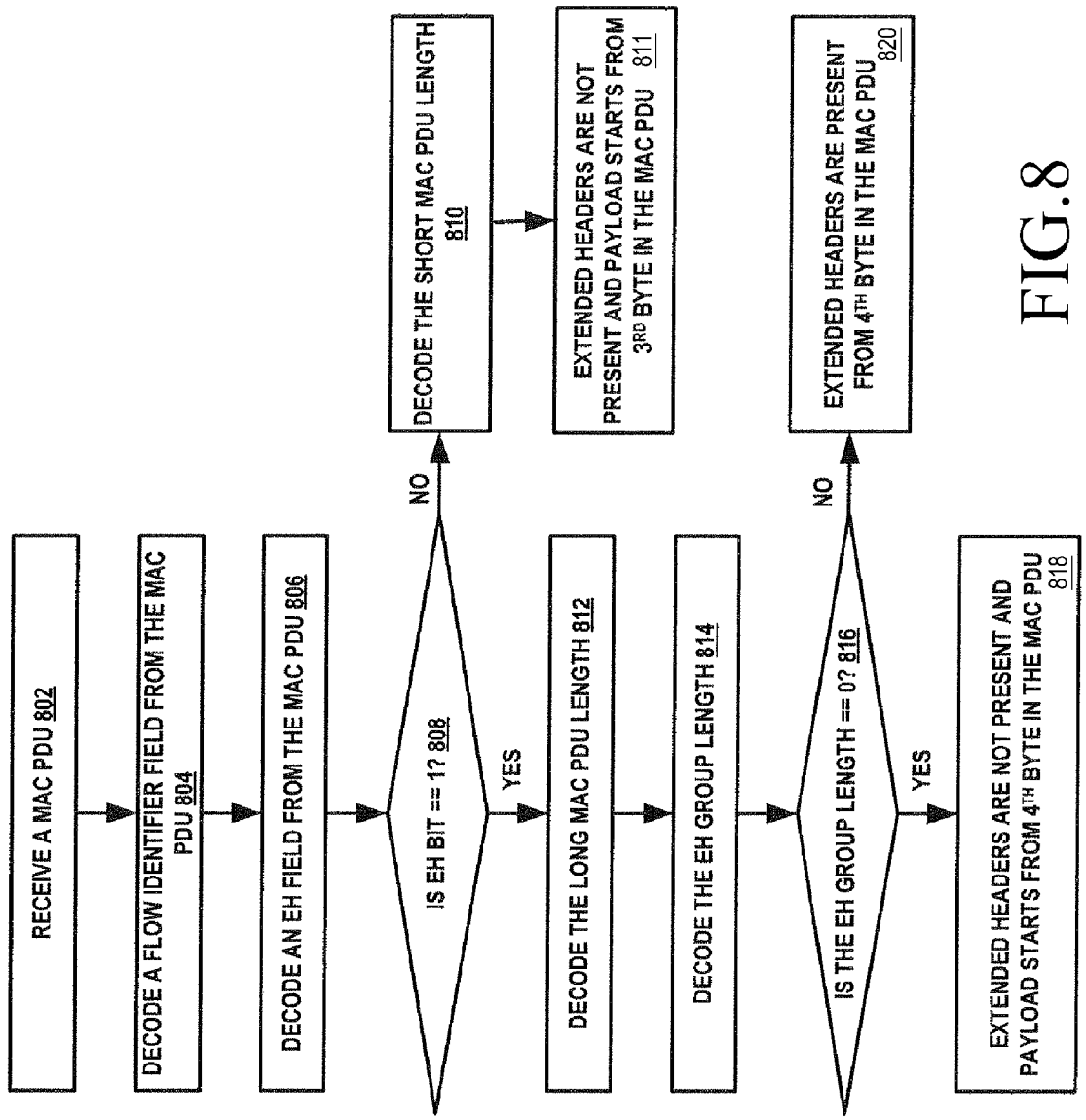
FIG. 8 is a flowchart illustrating a method of decoding control information in the MAC PDU, according to an embodiment of the present invention.

FIG. 8 is a flowchart illustrating a method of decoding control information in the MAC PDU 600, according to an embodiment of the present invention. In step 802, the MAC PDU 600 is received at a receiving device. Upon receiving the MAC PDU 600, the receiving device decodes control information from the first n bytes, where n equals a size of the MAC header field 602 plus a size of the fixed information field 614 in the received MAC PDU 600 as described below. In step 804, connection type information is decoded from the flow identifier field 608. In step 806, information associated with presence or absence of the EH group field 604 in the MAC PDU 600 is decoded from the EH field 610. In step 808, it is determined whether the EH group field 604 is present in the MAC PDU 600. In an embodiment of the present invention, it is determined whether the EH field 610 is set to '1'. If the EH field 610 is set to '0', the short MAC PDU length is decoded from the length field 612 in step 810. When the EH field 610 is set to '0', it implies that the extended header group field 604 is absent and the payload field 606 starts from the nth byte of the MAC PDU 600, in step 811, where n equals to size of the MAC header field 602 plus one.

If the EH field 610 is set to '1' in step 808, MAC PDU length information is decoded from the length field 612 and the MAC PDU length extension field 618 in step 812. In an embodiment of the present invention, the decoded MAC PDU length information indicates the length of the MAC PDU 600 that is greater than a size that can be encoded in the length field 612 and may, in combination, indicate the length of the MAC PDU 600. One skilled in the art will realize that encoding of the MAC PDU length information in the length field 612 and the MAC PDU length extension field 618 enables the receiving device to decode the 14-bit length field. Thus, the need to parse EHs in the EH group field 604 is eliminated. In step 814, information associated with presence of EHs is decoded from the EH group length field 620. At step 816, it is determined whether the length information in the EH group length field 620 is set to zero. If it is set to zero, it implies that EHs are not present in the variable information field 616 and the payload field 606 starts from the nth byte of the MAC PDU 600, in step 818, where n equals to size of the MAC header field 602 plus size of the fixed information field 614 plus one. For example, n equals 4 when the size of the MAC header field 602 is 2 bytes and the size of the fixed information field 614 is 1 byte including a 3-bit MAC PDU length extension field 618 and a 5 bit EH Group length field 620. Alternatively, when the EH group length field 320 is used to indicate length of the EH group field 604, the EH group length being equal to the size of the fixed information field 614 indicates that zero EHs are present in the variable information field 616 and the payload field 606 starts from the nth byte of the MAC PDU 600, in step 820, where n equals to size of the MAC header field 602 plus size of the fixed information field 614 plus one. For example, n equals to 4 when size of the MAC header field 602 is 2 bytes and size of fixed information field 614 is 1 bytes including the 3 bit MAC PDU length extension field 618 and the 5 bit EH group length field 620.

If the EH group length equal zero, it implies that EHs are present in the variable information field 616 and starts from the nth byte of the MAC PDU 600, where n equals the size of the MAC header field 602 plus the size of the fixed information field 614 plus one. Alternatively, in case the EH group length field 320 is used to indicate the length of the EH group field 604, the EH group length being greater than size of the fixed information field 614 indicates that EHs are present in the variable information field 616 and starts from the nth byte of the MAC PDU 600, where n equals the size of the MAC header field 602 plus the size of the fixed information field 614 plus one. For example, the size of the fixed information field 614 is 1 byte including the 3-bit MAC PDU length extension field 618 and the 5-bit EH group length field 620. The value of n equals to 4 when the size of the MAC header field is 2 bytes and the size of the fixed information field 614 is 1 byte.

Moreover, in an embodiment of the present invention, a non-transitory computer-readable storage medium having instructions stored therein, that when executed by a transmitting device or receiving device, result in performing a method of encoding or decoding control information in a MAC PDU illustrated in FIGS. 4, 5, 7 and 8.

Figure 9A:
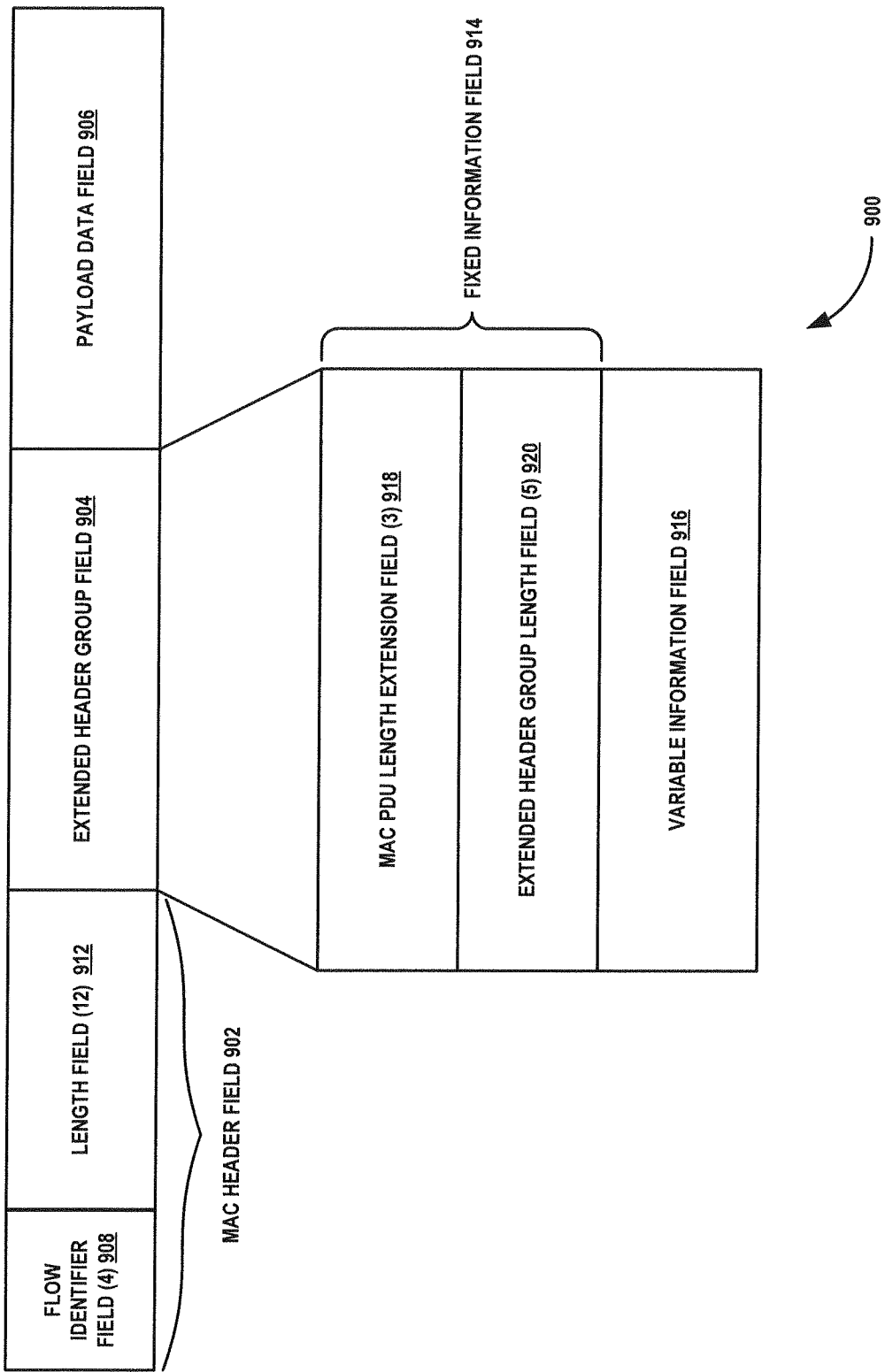
FIG. 9A is a diagram illustrating a MAC PDU for a transport connection, according to an embodiment of the present invention.

Referring now to FIG. 9A, a diagram illustrates a MAC PDU 900 for a transport connection, according to an embodiment of the present invention. The MAC PDU 900 is similar to the MAC PDU 600 except the MAC PDU 900 does not include an EH field in the MAC header field 902. When the MAC PDU 900 is associated with the transport connection, a flow ID field 908 indicates a type of connection as 'transport connection'. The reason for not including the EH field in the MAC header field 902 is that an EH group field 904 is always encoded in the MAC PDU associated with the transport connection. One skilled in the art can envision that the MAC PDU 900 can be similar to the MAC PDU 300 including a MAC header without the EH field.

Figure 9B:
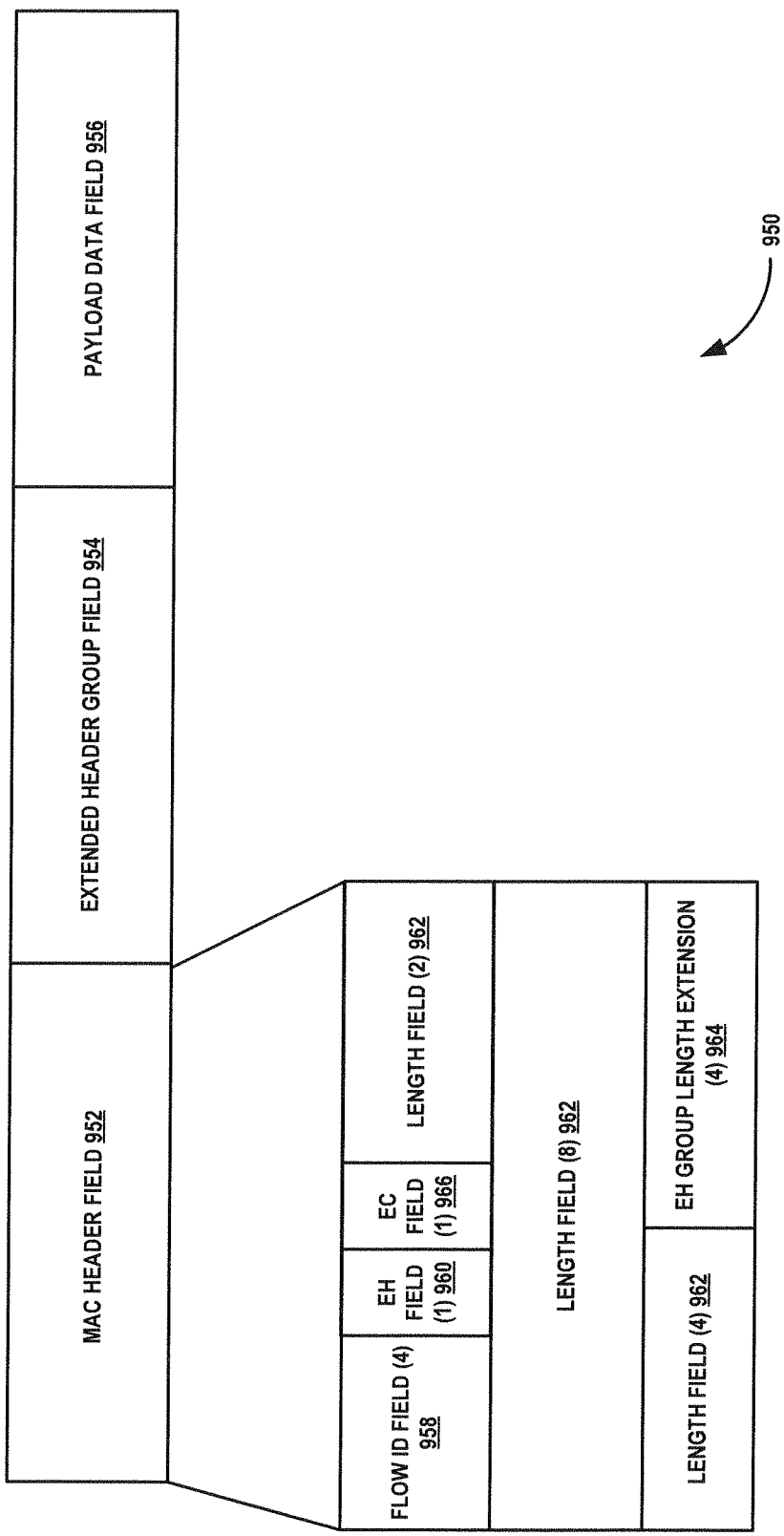
FIG. 9B is a diagram illustrating a MAC PDU for a transport connection, according to another embodiment of the present invention.

FIG. 9B is a diagram illustrating a MAC PDU 950 for a transport connection, according to another embodiment of the present invention. The MAC PDU 950 includes a MAC header field 952, an EH group field 954, and a payload field 956. The MAC header field 952 includes a flow ID field 958, an EH field 960, a length field 962, an EH group length extension field 964, and optionally an EC field 966. The length field 962 is enabled to indicate the short or long length of the MAC PDU 950. The EH group extension field 964 facilitates larger EH group length for a transport connection. If the larger EH group is present in the MAC PDU 950, MSBs of the EH group length are encoded in the EH group length extension field 964. It is appreciated that, a MAC PDU for the control connection is same as those shown in FIGS. 3 and 6.

Figure 10A:
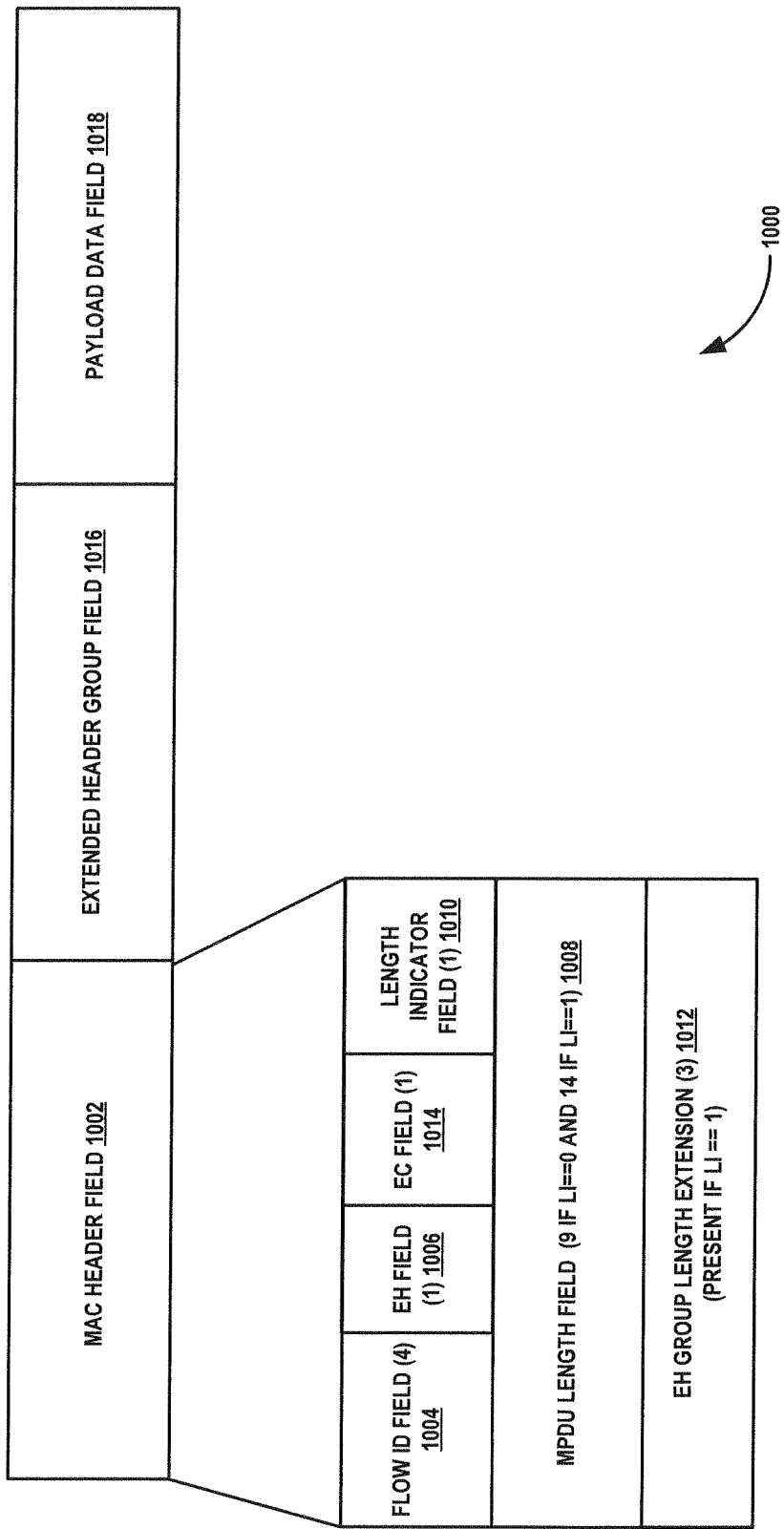
FIG. 10A is a diagram illustrating a MAC PDU supporting short and long MAC PDU length and extended header group length extensions in a MAC header field, according to an embodiment of the present invention.

FIG. 10A is a diagram illustrating a MAC header 1000 supporting short and long MAC PDU length and EH group length extensions in a MAC header field 1002, according to an embodiment of the present invention. In FIG. 10A, the MAC PDU includes a MAC header field 1002, an EH group field 1016, and a payload field 1018. The MAC header field 1002 includes a flow identifier field 1004, an EH field 1006, a length field 1008, a Length Indicator (LI) field 1010, an EH group length extension field 1012, and optionally an EC field 1014.

According to an embodiment of the present invention, the EH field 1006 and the LI field 1010 together indicate presence or absence of long or short EH group length. Also, the LI field 1010 indicates short or long MAC PDU length field. Further, the LI field 1010 indicates the presence and absence of the EH group length extension field 1012.

Figure 10B:
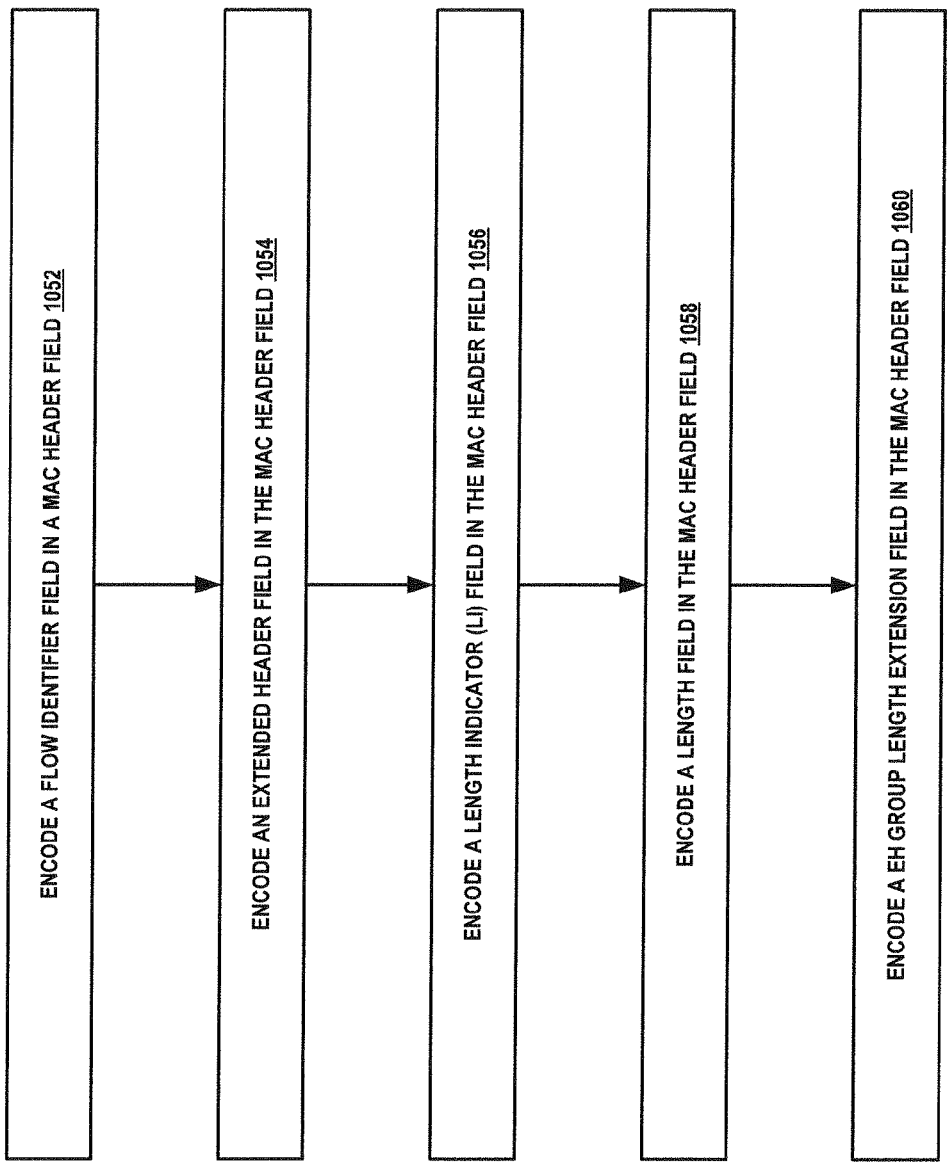
FIG. 10B is a flowchart illustrating a method of encoding control information in the MAC header field of the MAC PDU, according to an embodiment of the present invention.

Referring now to FIG. 10B, a flowchart illustrating a method of encoding control information in the MAC header field of the MAC PDU, according to an embodiment of the present invention. The flow identifier field 1004 is encoded in the MAC header field 1002 for indicating a type of connection associated with the MAC PDU 1000, in step 1052. The EH field 1006 following the flow ID field 1004 is encoded in the MAC header field 1002, in step 1054. The LI field 1010 is encoded in the MAC header field 1002, in step 1056. The length field 1008 is encoded in the MAC header field 1002 for indicating length of the MAC PDU 1000, in step 1058. Finally, the EH group length extension field 1012 is encoded in the MAC header field 1002 for indicating length information associated with the EH group field 1016, in step 1060, where the length information indicates whether the EH group field 1016 is short length or long length. It can be noted that, the presence of the EH group length extension field 1012 is indicated in the LI field 1010.

As described above, the EH field 1006 in conjunction with the LI field 1010 indicate the presence or absence of a short or long EH group length field in an EH group field 1016 following the MAC header field 1002, the presence and absence of EHs in the EH group field 1016. For example, the EH field 1006=0 and the LI field 1010=0 in the MAC header field 1002 indicates absence of EHs in the MAC PDU, short MAC PDU length in the length field 1008, absence of the EH group length extension field 1012 in the MAC header field 1002.

The EH field 1006=0 and the LI field 1010=1 in the MAC header field 1002 indicates absence of EHs in the MAC PDU, long MAC PDU length in the length field 1008, presence of the EH group length extension field 1012 in the MAC header field 1002 and is set to zeros. The EH field 1006=1 and the LI field 1010=1 in the MAC header field 1002 indicates short EH group length, short MAC PDU length in the length field 1008, absence of the EH group length extension field 1012 in the MAC header field 1002. Lastly, the EH field 1006=1 and the LI field 1010=1 in the MAC header field 1002 indicates long EH group length, long MAC PDU length in the length field 1008, presence of the EH group length extension field 1012 in the MAC header field 1002 and is set to MSBs of the long EH group length.

Figure 11:
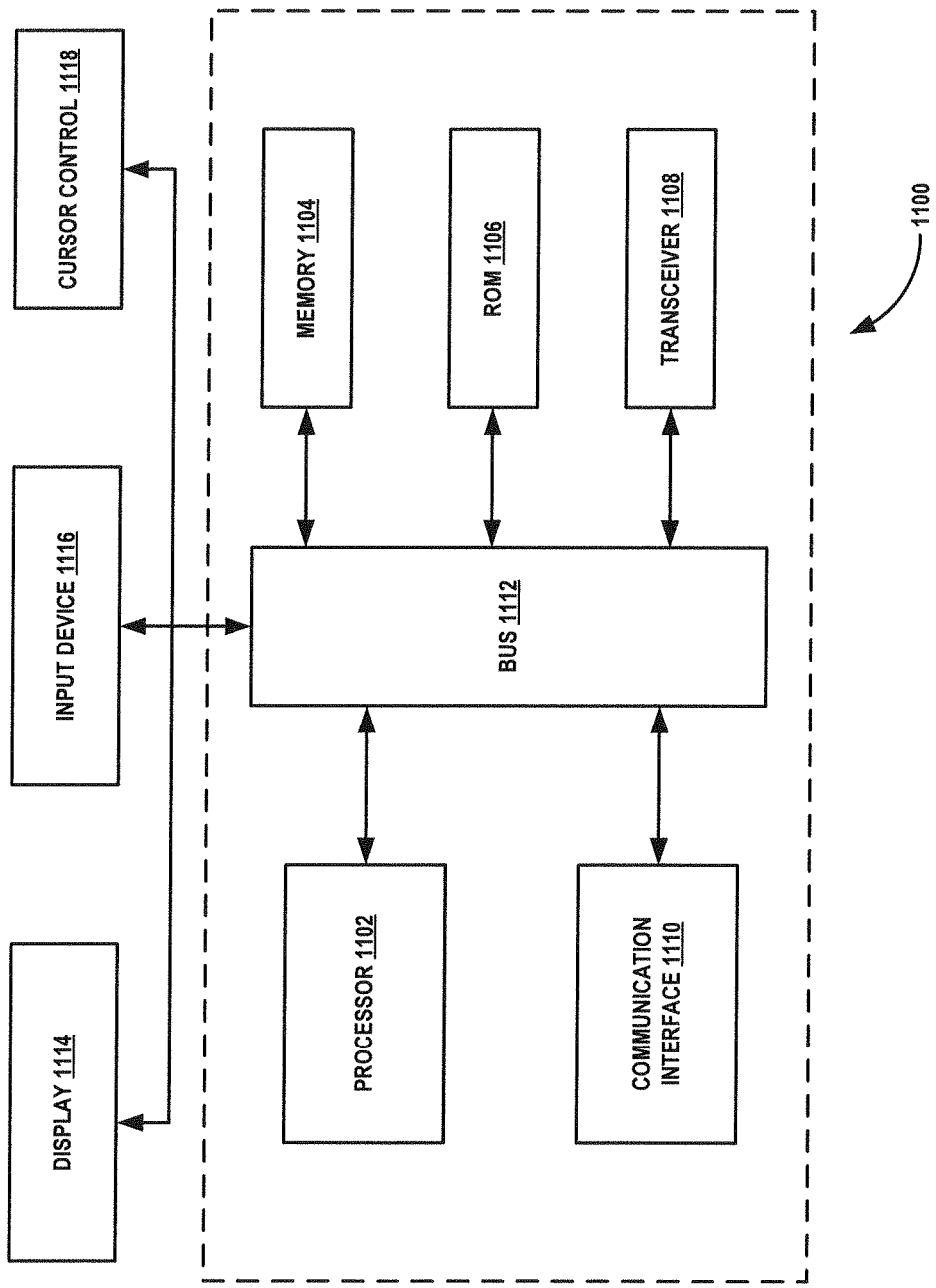
FIG. 11 is a block diagram illustrating a transmitting device, according to an embodiment of the present invention.

FIG. 11 is a block diagram illustrating a transmitting device 1100, according to an embodiment of the present invention The transmitting device 1100 includes a processor 1102, a memory 1104, a Read Only Memory (ROM) 1106, a transceiver 1108, a bus 1112, a communication interface 1110, a display 1114, an input device 1116, and a cursor control 1118.

The processor 1102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 and the ROM 1106 may be a volatile memory and a non-volatile memory. The memory 1104 is configured to temporarily store the instruction(s) capable of encoding control information in the MAC PDU 300, according to one or more embodiments of the present invention described above. A variety of computer-readable storage media may be stored in and accessed from the memory elements. Memory elements may include any suitable memory device(s) for storing data and machine-readable instructions, such as ROM, Random Access Memory RAM, erasable programmable ROM, electrically erasable programmable ROM, hard drive, removable media drive for handling compact disks, digital video disks, diskettes, magnetic tape cartridges, memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 1102. For example, a computer program may include machine-readable instructions capable of encoding the control information in the MAC PDU according to the teachings and embodiments of the present invention.

The processor 1102 may execute the computer program having machine readable instructions capable of encoding a first set of control information in the MAC header field 302 of the MAC PD 300, encoding a second set of control information in the EH group field 304 substantially following the MAC header field 306. The first set of control information in conjunction with the second set of control information indicate whether the MAC PDU is of a short length or a long length and whether EHs are present in the EH group field. The machine-readable instructions may be capable of encoding payload data in the payload field 306 of the MAC PDU 300.

In an embodiment of the present invention, the program may be included on a Compact Disk-ROM (CD-ROM) and loaded from the CD-ROM to a hard drive in the non-volatile memory. The machine-readable instructions may cause the transmitting device 1100 to encode according to the various embodiments of the present invention.

The transceiver 1108 may be capable of transmitting the MAC PDU having encoded control information over the wireless communication network. The bus 1112 acts as interconnect between various components of the transmitting device 1100. The components such as the communication interfaces 1110, the display 1114, the input device 1116, and the cursor control 1118 are well known to those skilled in the art.

Figure 12:
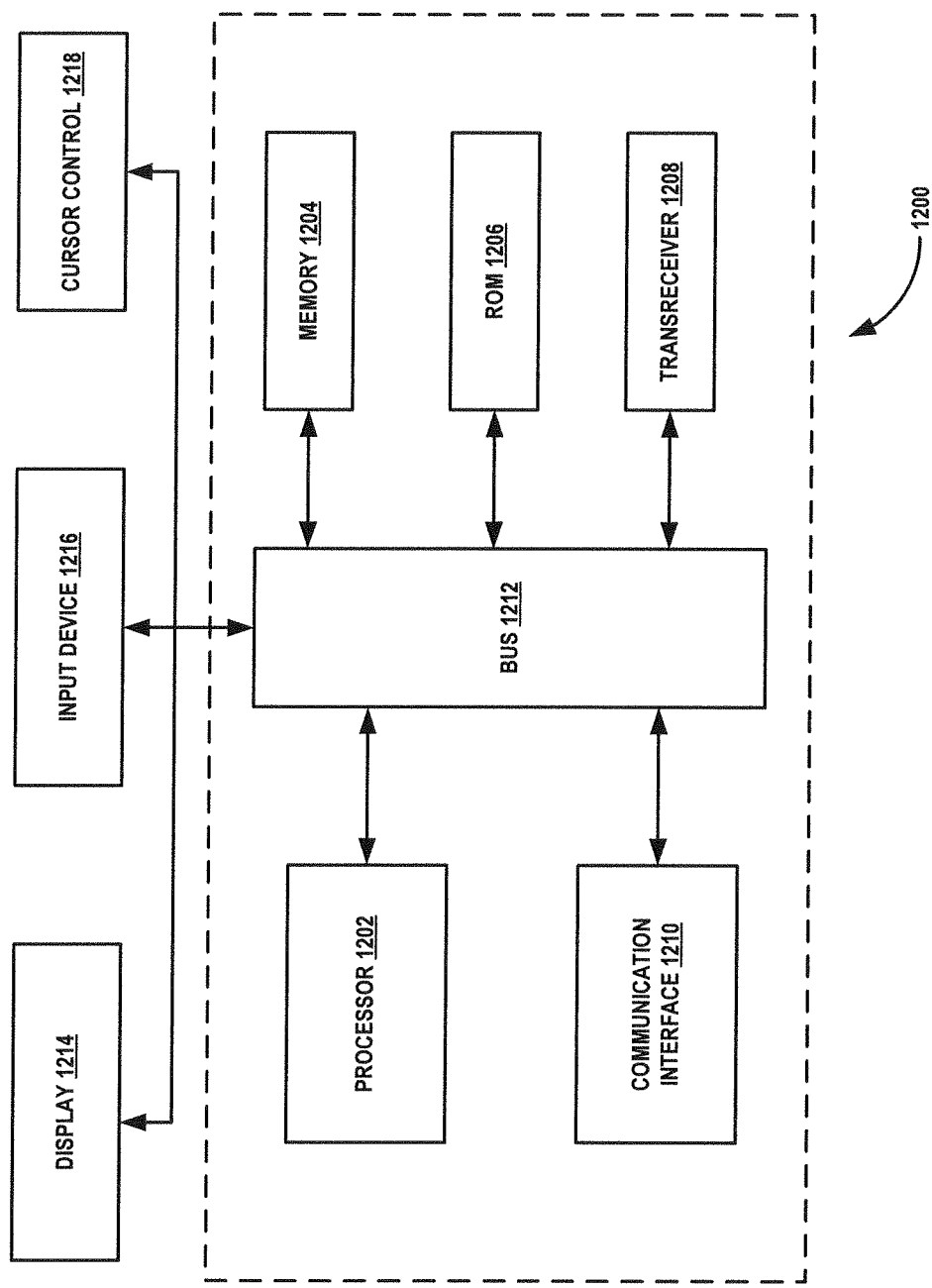
FIG. 12 is a block diagram illustrating a receiving device, according to an embodiment of the present invention.

FIG. 12 is a block diagram illustrating a receiving device 1200 showing various components for implementing embodiments of the present invention. The receiving device 1200 includes a processor 1202, a memory 1204, a ROM 1206, a transceiver 1208, a bus 1212, a communication interface 1210, a display 1214, an input device 1216, and a cursor control 1218.

The processor 1202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1202 may also include embedded controllers, such as generic or programmable logic devices or arrays, application specific integrated circuits, single-chip computers, smart cards, and the like.

The memory 1204 and the ROM 1206 may be a volatile memory and a non-volatile memory. The memory 1204 is configured to temporarily store the instruction(s) capable of decoding control information in the MAC PDU 300, according to one or more embodiments described above. A variety of computer-readable storage media may be stored in and accessed from the memory elements. Memory elements may include any suitable memory device(s) for storing data and machine-readable instructions, such as ROM, RAM, erasable programmable ROM, electrically erasable programmable ROM, hard drive, removable media drive for handling compact disks, digital video disks, diskettes, magnetic tape cartridges, memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 1202. For example, a computer program may include machine-readable instructions capable of decoding the control information in the MAC PDU according to the teachings and herein described embodiments of the present invention.

The processor 1202 may execute the computer program having machine readable instructions capable of decoding the encoded first set of control information from the MAC header field 302 of the MAC PDU 300, decoding the encoded second set of control information from the extended header group field 304 substantially following the MAC header field 302. The decoded first set of decoded control information in conjunction with the decoded second set of control information indicate whether the MAC PDU 300 is of a short length or a long length and whether EHs are present in the EH group field. The machine-readable instructions are further capable of decoding encoded payload data from the payload field 306 of the MAC PDU 300 based on the decoded first set of control information and the decoded second set of control information.

In an embodiment of the present invention, the program may be included on a CD-ROM and loaded from the CD-ROM to a hard drive in the non-volatile memory. The machine-readable instructions may cause the receiving device 1200 to decode according to the various embodiments of the present invention.

The transceiver 1208 may be capable of receiving the MAC PDU 300 having encoded control information via the wireless communication network. The bus 1212 acts as interconnect between various components of the receiving device 1200. The components such as communication interfaces 1210, the display 1214, the input device 1216, and the cursor control 1218 are well known to the person skilled in the art.

While the invention has been shown and described with reference to certain embodiments thereof, it will be understood by those skilled in the art that various changes in form and detail may be made therein without departing from the spirit and scope of the invention as defined by the appended claims. Accordingly, the specification and figures are to be regarded as illustrative examples of the present disclosure, rather than in a restrictive sense. All such possible modifications are intended to be included within the scope of present disclosure. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of transmitting a medium access control (MAC) protocol data unit (PDU) in a transmitting device, the method comprising the steps of:

generating the MAC PDU including a MAC header, an extended header group and a payload; and
transmitting the MAC PDU to a receiving device,
wherein the MAC header comprises an extended header (EH) field, and the extended header group comprises a MAC PDU length extension field, an extended header length indicator field, and an extended header length field,
wherein the EH field indicates presence of the extended header group and the extended header length field indicates a length of the extended header group, wherein if there is no extended header in the MAC PDU, the extended header length indicator field is set to '0', and wherein if the extended header length indicator field is set to '0', the length of the extended header group is equal to a sum of length of extended headers+1.

2. The method of claim 1, wherein if the MAC header is a generic MAC header (GMH), the MAC header further comprises a flow identifier field and a length field, and wherein if the EH field is set to '0', the length field represents an 11 bit MAC PDU length.

3. The method of claim 1, wherein if the MAC header is a short packet MAC header (SPMH), the MAC header further comprises a flow identifier field, a length field, and a sequence number (SN) field, the MAC PDU length extension field is set to '0', and the extended header length indicator field is set to '0'.

4. The method of claim 2, wherein if the MAC header is the GMH, the MAC PDU length extension field is added to an 11 bit length field in the MAC header, and the MAC PDU length extension field represents 3 most significant bits (MSBs) of a 14 bit MAC PDU length.

5. The method of claim 1, wherein if there is no extended header in the MAC PDU, the extended header length field is set to '1'.

6. The method of claim 1, wherein if the extended header length indicator field is set to '1', the length of the extended header group is equal to a sum of length of extended headers+2.

7. A method of receiving a medium access control (MAC) protocol data unit (PDU) in a receiving device, the method comprising the steps of:

receiving the MAC PDU; and decoding a MAC header, an extended header group and a payload that are included in the MAC PDU, wherein the MAC header includes an extended header (EH) field, and the extended header group includes a MAC PDU length extension field, an extended header length indicator field, and an extended header length field, wherein the EH field indicates presence of the extended header group, and the extended header length field indicates a length of the extended header group, wherein if there is no extended header in the MAC PDU, the extended header length indicator field is set to '0', and wherein if the extended header length indicator field is set to '0', the length of the extended header group is equal to a sum of length of extended headers+1.

8. The method of claim 7, wherein if the MAC header is a generic MAC header (GMH), the MAC header further includes a flow identifier field and a length field, and wherein if the EH field indicating presence of the extended header group is set to '0', the length field represents an 11 bit MAC PDU length.

9. The method of claim 7, wherein if the MAC header is a short packet MAC header (SPMH), the MAC header further includes a flow identifier field, a length field, and a sequence number (SN) field, the MAC PDU length extension field is set to '0', and the extended header length indicator field is set to '0'.

10. The method of claim 8, wherein if the MAC header is the GMH, the MAC PDU length extension field is added to an 11 bit length field in the MAC header, and the MAC PDU length extension field represents 3 most significant bits (MSBs) of a 14 bit MAC PDU length.

11. The method of claim 7, wherein if there is no extended header in the MAC PDU, the extended header length field is set to '1'.

12. The method of claim 7, wherein if the extended header length indicator field is set to '1', the length of the extended header group is equal to a sum of length of extended headers+2.

13. An apparatus for transmitting a medium access control (MAC) protocol data unit (PDU), the apparatus comprising:

a processor for generating the MAC PDU comprising a MAC header, a extended header group and a payload; and a transceiver for transmitting the MAC PDU to a receiving device, wherein the MAC header comprises an extended header (EH) field, and the extended header group comprises a MAC PDU length extension field, an extended header length indicator field, and an extended header length field, wherein the EH field indicates presence of the extended header group and the extended header length field indicates a length of the extended header group, wherein if there is no extended header in the MAC PDU, the extended header length indicator field is set to '0', and wherein if the extended header length indicator field is set to '0', the length of the extended header group is equal to a sum of length of extended headers+1.

14. The apparatus of claim 13, wherein if the MAC header is a generic MAC header (GMH), the MAC header further comprises a flow identifier field and a length field, and wherein if the EH field indicating presence of the extended header group is set to '0', the length field represents an 11 bit MAC PDU length.

15. The apparatus of claim 13, wherein if the MAC header is a short pocket MAC header (SPMH), the MAC header further comprises a flow identifier field, a length field, and a sequence number (SN) field, the MAC PDU length extension field is set to '0', and the extended header length indicator field is set to '0'.

16. The apparatus of claim 14, wherein if the MAC header is the GMH, the MAC PDU length extension field is added to an 11 bit length field in the MAC header, and the MAC PDU length extension field represents 3 most significant bits (MSBs) of a 14 bit MAC PDU length.

17. The apparatus of claim 13, wherein if there is no extended header in the MAC PDU, the extended header length field is set to '1'.

18. The apparatus of claim 13, if the extended header length indicator field is set to '1', the length of the extended header group is equal to sum of length of extended headers+2.

19. An apparatus for receiving a medium access control (MAC) protocol data unit (PDU), the apparatus comprising:

a transceiver for receiving the MAC PDU; and a processor for decoding a MAC header, an extended header group and a payload that are included in the MAC PDU;

wherein the MAC header includes an extended header (EH) field, and the extended header group includes a MAC PDU length extension field, an extended header length indicator field, and an extended header length field, wherein the EH field indicates presence of the extended header group and the extended header length field indicates a length of the extended header group, wherein if there is no extended header in the MAC PDU, the extended header length indicator field is set to '0', and wherein if the extended header length indicator field is set to '0', the length of the extended header group is equal to sum of length of extended headers+1.

20. The apparatus of claim 19, wherein if the MAC header is a generic MAC header (GMH), the MAC header further comprises a flow identifier field and a length field, and wherein if the EH field indicating presence of the extended header group is set to '0', the length field represents an 11 bit MAC PDU length.

21. The apparatus of claim 19, wherein if the MAC header is a short packet MAC header (SPMH), the MAC header further comprises a flow identifier field, a length field, and a sequence number (SN) field, the MAC PDU length extension field is set to '0', and the extended header length indicator field is set to '0'.

22. The apparatus of claim 20, wherein if the MAC header is the GMH, the MAC PDU length extension field is added to an 11 bit length field in the MAC header, and the MAC PDU length extension field represents 3 most significant bits (MSBs) of a 14 bit MAC PDU length.

23. The apparatus of claim 19, wherein if there is no extended header in the MAC PDU, the extended header length field is set to '1'.

24. The apparatus of claim 19, wherein if the extended header length indicator field is set to '1', the length of the extended header group is equal to sum of length of extended headers+2.

* * * * *